Sept. 21, 1937.   M. W. KULCZAK   2,093,840
SNOW REMOVER DEVICE
Filed Aug. 7, 1936   3 Sheets-Sheet 1

Inventor
M. W. Kulczak

By Clarence A. O'Brien and
Hyman Berman
Attorneys

Sept. 21, 1937.   M. W. KULCZAK   2,093,840
SNOW REMOVER DEVICE
Filed Aug. 7, 1936   3 Sheets-Sheet 3

Inventor
M. W. Kulczak
By Clarence A. O'Brien and
Hyman Berman
Attorneys

Patented Sept. 21, 1937

2,093,840

UNITED STATES PATENT OFFICE 2,093,840

SNOW REMOVER DEVICE

Michael W. Kulczak, Chicago, Ill.

Application August 7, 1936, Serial No. 94,867

2 Claims. (Cl. 37—13)

This invention has reference to apparatus for the removing of snow and the object of the invention is to provide a device which may be mounted on a motor vehicle such as a truck, or on a locomotive or the like for clearing road and track-ways of snow.

The invention together with its objects and advantages will be best understood from a study of the following description taken in connection with the accompanying drawings wherein:—

Figure 4 is a fragmentary detail view partly in section and partly in elevation illustrating certain details hereinafter more fully referred to.

Figure 1:
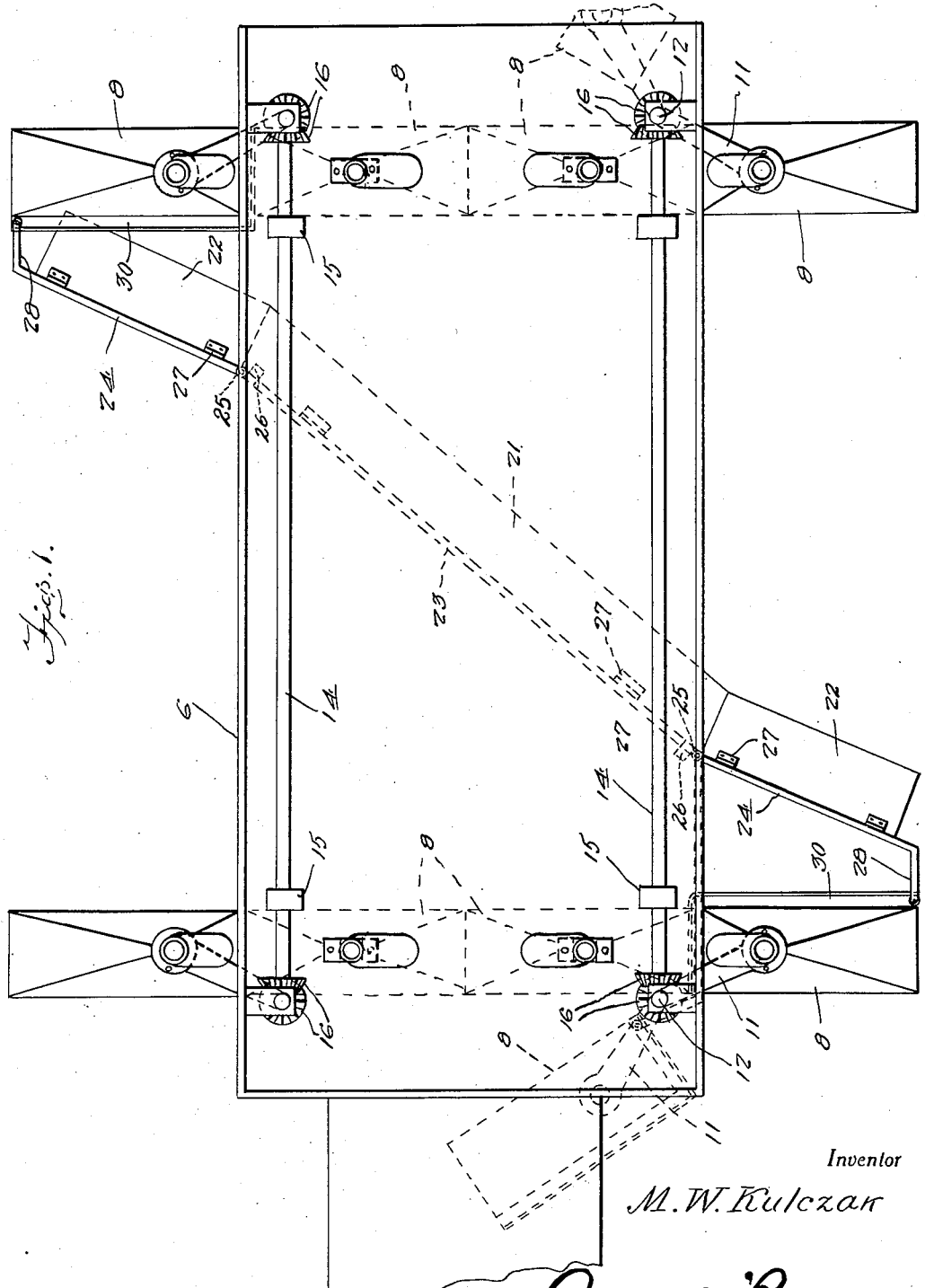
Figure 1 is a top plan view of the apparatus as applied to a truck.
Figure 2:
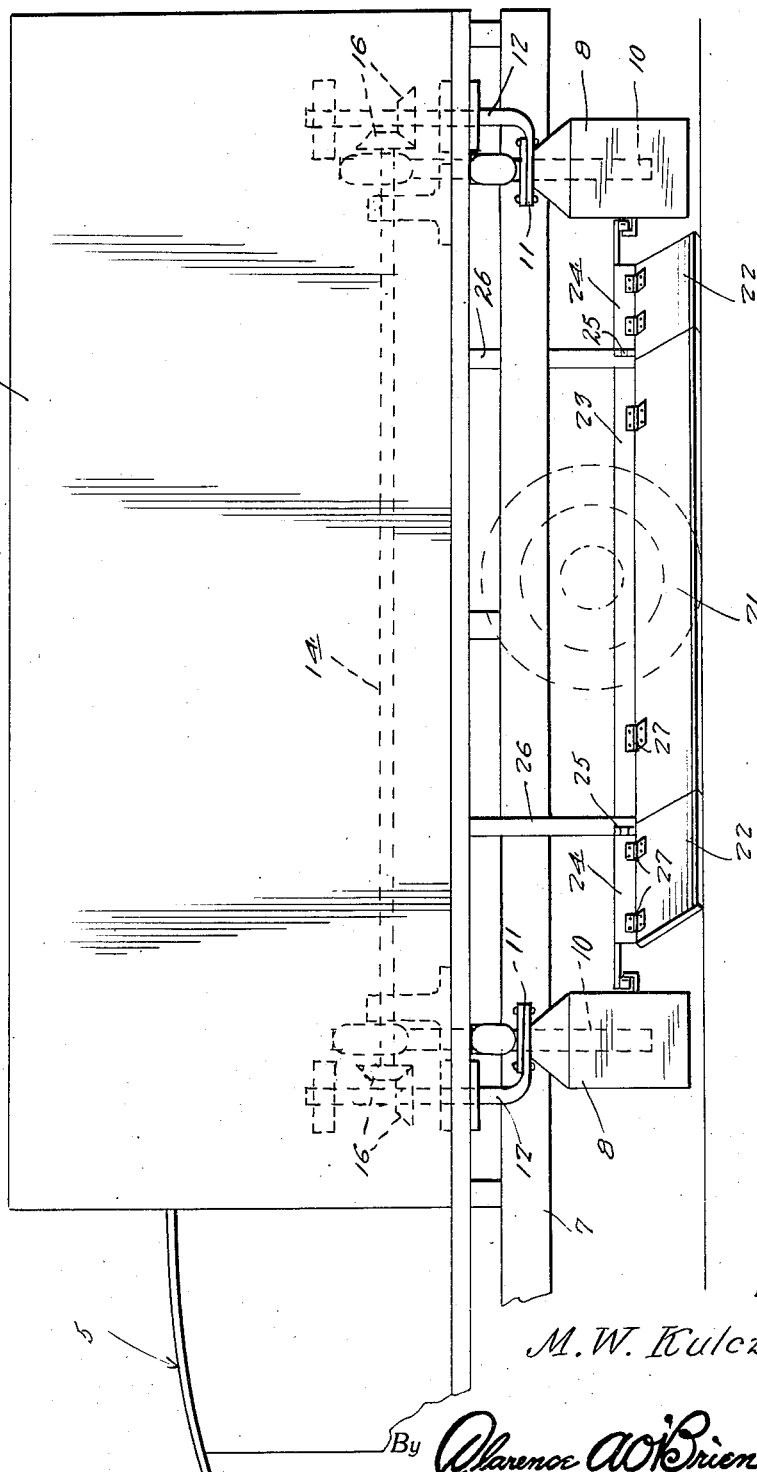
Figure 2 is a side elevational view thereof.
Figure 3:
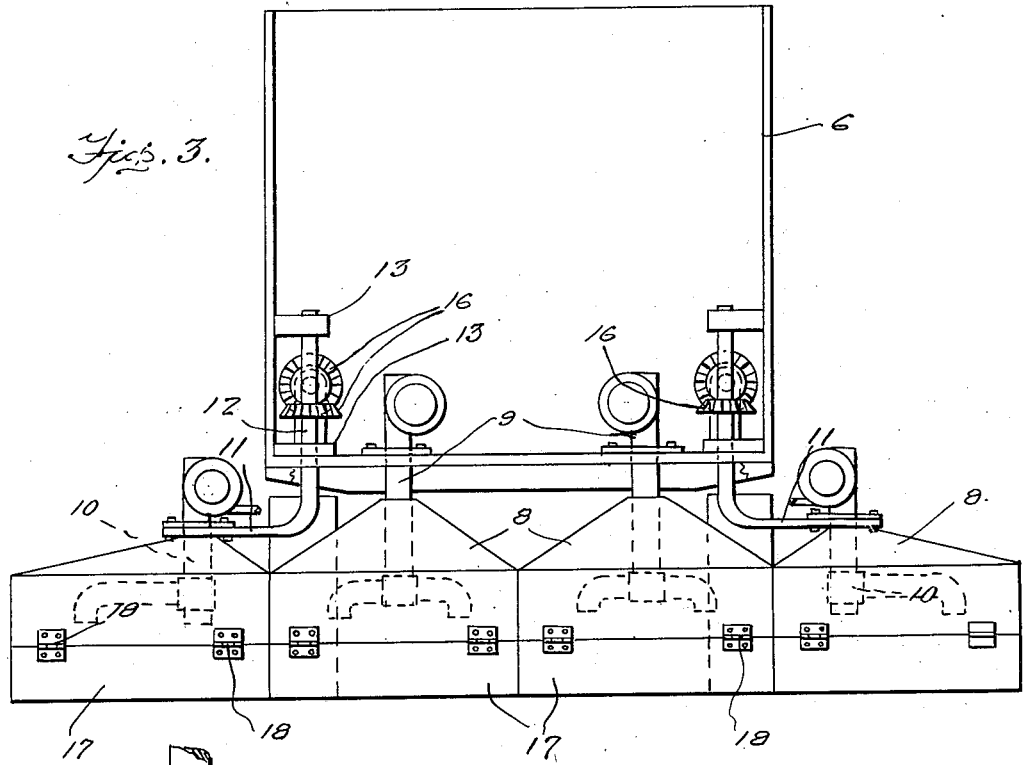
Figure 3 is an end elevational view of the apparatus.

Referring to the drawings by reference numerals it will be seen that in the form of the invention particularly adapted to be mounted on a motor truck, a portion of which only is shown in the drawings and indicated generally by the reference numeral 5, there is provided a substantially box-like casing 6 adapted to be mounted on the chassis 7 of the truck, and the member 6 is open at the top and at the rear end thereof.

Further in accordance with the present invention there is a forwardly disposed battery of hoods and a rearwardly disposed battery of hoods 8.

In the present instance each battery of hoods is shown as consisting of four hoods and each hood consists of a substantially rectangular body having a substantially pyramidal top and open at its bottom.

The two intermediate hoods of each of the battery of hoods are suspended through the medium of suitable brackets (not shown), while for the endmost hoods there are provided carrier arms 11 that extend laterally from the lower ends of vertical shaft 12 suitably journaled at the front and rear of the body 6 in bearings 13.

For each of the several hoods there is provided an oil burner, the oil burners for the intermediate hoods being indicated by the reference numeral 9 and for the endmost hood, of each group of hoods are the reference numeral 10.

The oil burners are of any suitable construction and have tubular conduits extending from the pumps thereof through the tops of the hoods and equipped at their lower ends with nozzles arranged within the several hoods as shown.

The endmost hoods 8 and associated oil burners are mounted on the arms 11 to swing therewith whereby the endmost hoods 8 may be swung to and from the dotted line position suggested in Figure 1.

For rotating or turning the shafts 12 there are provided horizontal shafts 14 journaled in suitable bearings 15 provided within the boxing or housing 6.

At each end thereof each shaft 14 is in driving engagement with a shaft 12 through the medium of bevelled gearing 16.

The shaft 14 may be equipped with crank handles or otherwise provided to facilitate the rotation of the shaft 14 for swinging the endmost hoods 8 into and out of the dotted line position shown in Figure 1.

Also, each of the hoods 8 has a front lower wall section 17 hinged thereto as at 18 and a rear lower wall section 19 hinged thereto as at 20.

It will be seen that the wall sections 17 and 19 are mounted to swing in a direction reverse to the direction of travel so as to yield to heavy or large drifts of snow and consequently not impair forward progress of the vehicle.

In connection with the above it will be understood that heat from the forward-most burners 10 will serve to melt the snow while the heat from the burners associated with the rear gang or battery of hoods will serve to dry the roadway.

In melting the snow on a narrow roadway the inmost hoods 8 are readily swung into the dotted line position shown in Figure 1 by rotating the shafts 14 as is thought to be obvious.

Further, in accordance with the present invention there is disposed diagonally between the two gangs or batteries of hoods a sweeper blade which consists of a plurality of sections including an intermediate section 21 and end sections 22.

For the sections 21 and 22 there are provided supporting bars 23 and 24, the supporting bars 24 being hinged to the respective opposite ends of the bar 23 as at 25 while bar 23 is suitably secured to hangers 26 depending from the bottom of the box or casing 6.

The sections 21 and 22 of the sweeper blade are hinged to their respective bars 23 and 24 as at 27.

Figure 4:
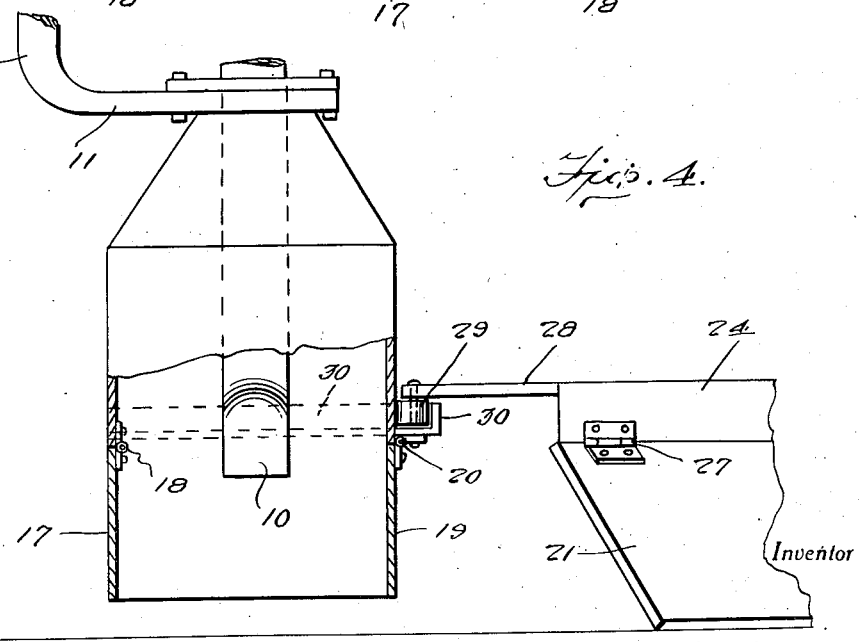

The supporting bar 24 for each of the blade sections 26 has an angular free end 28 provided with a roller 29 that rides in a track 30 that extends along the rear side and the inner side walls of an adjacent end hood 8 as shown in Figures 1 and 4.

It will thus be seen that when the endmost hoods 8 are disposed in alignment with the intermediate hoods the endmost blade sections 22 are reversely disposed with respect to one another and are in angular relation to the intermediate blade sections 21 as shown in Figure 1.

It will also be apparent that as the endmost hoods 8 are caused to swing to the dotted line position shown in Figure 1 the endmost blades 22 will swing therewith to the dotted line position suggested in Figure 1.

Thus where a narrow road bed is being cleaned of snow it will be only necessary to swing the endmost hoods 8 and blades 22 to the dotted line position, positive removal of the endmost hoods and blades being thereby rendered unnecessary.

It will therefore be seen that in actual operation while the heat issuing from the forwardmost hoods will serve to melt the ice the sweeper blades will tend to scrape the snow and ice towards one side of the road while the heat from the rearwardmost hoods 8 will tend to dry the road surface thus rendering the surface clean, safe and dry thus minimizing the possibility of accidents due to skidding.

It is thought that the utility and advantages of an invention of this character will be had without a more detailed description.

Having thus described the invention what is claimed as new is:—

1. In combination, a vehicle, a battery of hoods disposed transversely of the vehicle adjacent the front and rear thereof, means arranged in each hood for melting snow and drying the roadway, and a sweeper blade supported beneath the vehicle and extending diagonally between the front and rear batteries of hoods.

2. In combination, a vehicle, a battery of hoods disposed transversely of the vehicle adjacent the front and rear thereof, means arranged in each hood for melting snow and drying the roadway, and a sweeper blade supported beneath the vehicle and extending diagonally between the front and rear batteries of hoods each battery of hoods including end hoods swingable laterally relative to the vehicle, and respectively provided with a trackway extending across the back and innermost end walls thereof, and said sweeper blade having hinged end sections provided with angular extensions equipped with rollers engaging in said trackways.

MICHAEL W. KULCZAK.